United States Patent [19]

Bova et al.

[11] 4,175,690
[45] Nov. 27, 1979

[54] APPARATUS AND METHOD FOR PRODUCING SECTIONED EDIBLES

[76] Inventors: Mary L. Bova; Ralph G. Bova, both of 80 Poplar Ave., Deal, N.J. 07723

[21] Appl. No.: 929,809

[22] Filed: Jul. 31, 1978

[51] Int. Cl.² .............................................. B23Q 7/10
[52] U.S. Cl. ..................... 227/76; 83/404.3; 99/537; 426/134; 426/121; 426/518
[58] Field of Search .................... 99/537, 543; 53/134; 83/89, 112, 404.3, 408, 431, 437; 227/76, 100, 117, 120, 131, 139; 426/134, 421, 482, 518

[56] References Cited
U.S. PATENT DOCUMENTS

| 2,851,767 | 9/1958 | Hooker | 99/452 X |
| 2,968,567 | 1/1961 | Hooker | 99/472 X |
| 3,502,126 | 3/1970 | Howard | 83/404.3 X |
| 3,691,608 | 9/1972 | Lowrance | 227/139 |

Primary Examiner—Paul A. Bell
Attorney, Agent, or Firm—Patrick J. Pinto

[57] ABSTRACT

There is disclosed an apparatus and a method for processing edibles, such as fruit, which are sliced and then sectioned. Watermelon is one of such edibles or fruit which is first sliced generally transverse of its long axis. These sliced pieces are automatically fed and moved to apparatus for sectioning the fruit. These sliced portions with their ends removed are then fed by automatic means into a sectioning apparatus where these circular portions of fruit are then cut into pie-shaped sections. After sectioning, a stick may be inserted into each sectional piece. The sectioned pieces may be wrapped and/or frozen, if desired. The apparatus and method steps are automatically and repetitively produced with appropriate high speeds that deliver shaped segments to further processing such as wrapping and/or freezing.

23 Claims, 18 Drawing Figures

APPARATUS AND METHOD FOR PRODUCING SECTIONED EDIBLES

BACKGROUND OF THE INVENTION

1. Field of the Invention

With reference to the classification of art as established in and by the United States Patent and Trademark Office, the present invention is believed to be in the general Class entitled, "Foods and Beverages, Apparatus" (Class 99) and in the subclass entitled, "subdividing into plural products" (subclass 537) and the further subclass entitled, "slicing" (subclass 543).

2. Description of the Prior Art

The peeling and sectioning of edibles such as fruits and vegetables is a very old art as well as a necessity. Many patents have been directed toward providing assistance to the peeling and sectioning particularly of fruits. The present invention pertains to substantially an automated and automatic means and method of slicing and then sectioning fruits such as watermelon.

In the prior art as shown in various U.S. patents and considered at least partially pertinent are U.S. Pat. No. 2,014,593 to SERGENT of Sept. 17, 1935; U.S. Pat. No. 2,211,919 to WOOL of Aug. 20, 1940 which shows apparatus for dicing fruit. U.S. Pat. No. 2,847,311 to DOUMAK et al. of Aug. 12, 1959 shows a conveyor on which a treatment of a product occurs. U.S. Pat. No. 2,851,767 to HOOKER of Sept. 16, 1958 shows apparatus for hand manipulating a shaping apparatus for edible material, particularly watermelon. U.S. Pat. No. 2,968,567 to the same HOOKER of Jan. 17, 1960 shows cutting of a slice of melon into six like segments by hand manipulation. Also shown is apparatus for hand manipulation of slicing the melon. U.S. Pat. No. 2,916,968 to LEBOVITZ of Dec. 15, 1959 shows a knife grid for cutting fish simultaneously both both in a horizontal and vertical arrangement. U.S. Pat. No. 3,057,386 to MASSARO of Oct. 9, 1962 shows a potato cutter. U.S. Pat. No. 3,079,964 to OLDERSHAW of Mar. 5, 1963 shows slicing apparatus for frozen fish. U.S. Pat. No. 3,187,432 to CUMO of June 8, 1965 shows cheese slicing apparatus and U.S. Pat. No. 3,348,655 to PIERCE, Jr., et al. of Oct. 23, 1967 shows a conveyor for fixed size articles.

In these and other known apparatus many operations are personally observed and/or supervised. Many steps are done by hand or hand assist which is time consuming and slow. The present apparatus, to be hereinafter more fully described, employs an automatic operation for each step and automatic transfer equipment for the moving of the edibles from whole to a finished section. The present apparatus is intended to be high speed in operation and essentially free of attendant requirement.

SUMMARY OF THE INVENTION

This invention may be summarized at least in part with reference to its objects.

It is an object of this invention to provide, and it does provide, an automatic slicing and sectioning apparatus for use with edibles such as fruit and the like. In particular, it is anticipated that fruit such as watermelon may be first sliced to a given thickness and then from a stack transferred one slice at a time to a sectioning apparatus wherein each slice is made into regular size sections. If desired, these sections may have low cost sticks inserted for the grasping or handling of the sections for eating.

It is an object of this invention to provide, and it does provide, a method whereby edibles such as fruit and particularly watermelon may be sliced transversely of its longitudinal axis into slices of given thickness which are then passed through a station wherein sticks may be inserted into each and every slice. These sections are then moved in an intermittent motion to a downward position where the knife portions are withdrawn and the slices are delivered to a conveyor for delivery to a wrapping and/or freezing station.

The method steps automatically produced by the apparatus, to be hereinafter more fully described, show a whole fruit being transferred from a hopper to a slicing station. This whole fruit is sliced into a plurality of slices after which the ends of the fruit are removed as they are not usable in the production of the desired edible product. These acceptable slices are fed from a stack one at a time and then are transferred by a feeding apparatus into an index wheel whereat each slice is substantially aligned. They are then fed to a segment cutter whereat the slice is sectioned into segments of each slice after which this sectioned slice is moved to an inserting station where a flexible stick may be inserted into each sectioned segment. Retaining belts are used to transport the sectioned slice until it is brought in way of a conveyor whereat it is delivered from the indexing wheel or apparatus onto a belt conveyor.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen a specific embodiment of the slicing and sectioning apparatus and method as adopted for use with edibles such as watermelon and showing a preferred means for inserting inexpensive sticks into each section. This specific embodiment has been chosen for the purposes of illustration and description as shown in the accompanying drawings wherein:

In the following description and in the claims various details are identified by specific names for convenience, said names, however, are intended to be generic in their application. Corresponding reference characters refer to like members throughout the several figures of the drawings.

The drawings accompanying this specification disclose certain details of construction for the purpose of explanation but it should be understood that these details may be modified in various respects without departure from the concept of the invention and that the invention may be incorporated in other structural forms than shown.

Figure 1A:
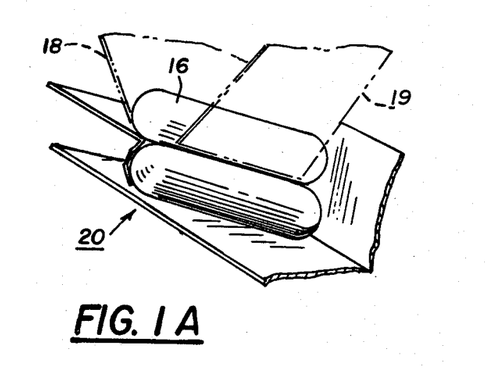
FIG. 1A represents a diagrammatic view of a loading chute wherein elongated edible fruit is dropped into a hopper and fed one at a time into a slicing apparatus.

Fruit Feeding Apparatus of FIG. 1A

Referring now in detail to the drawings in general and in particular to the step of arranging and feeding fruit to a slicing apparatus wherein FIG. 1A is a diagrammatic representation of an edible fruit such as watermelon generally indicated as 16. Side guide plates 18 and 19, shown in phantom outline, are disposed at an angle to provide a chute whereat only one elongated fruit 16 is fed to a slicing apparatus generally indentified as 20.

Figure 1B:
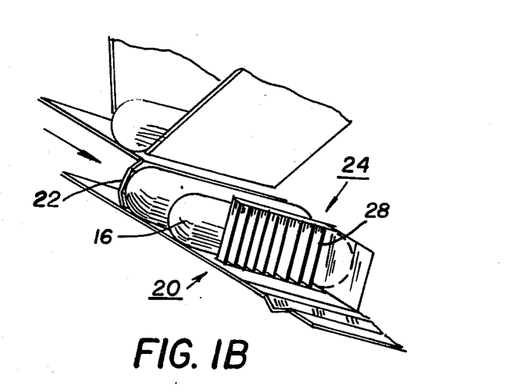
FIG. 1B represents a diagrammatic chute of FIG. 1A with the fruit sliced by a grid and pusher and delivered as a stack of slices to a later operation.

Fruit Slicing Apparatus of FIG. 1B

Referring next to the step of slicing as shown in FIG. 1B, it is contemplated that the elongated fruit 16 is in way of a pusher member 22 which advances the fruit to a knife grid 24 whereat the fruit is sliced into segments 26 whose thickness is the same as the spacing between the blades 28. A more detailed explanation of the slicing step is found in U.S. Pat. No. 2,968,567 to HOOKER, which patent is assigned to the owner of this application. To the extent pertinent, this patent is incorporated by reference into this application. Details of the slicing apparatus are also more clearly seen in FIG. 3, to be hereinafter more fully described.

Figure 1C:
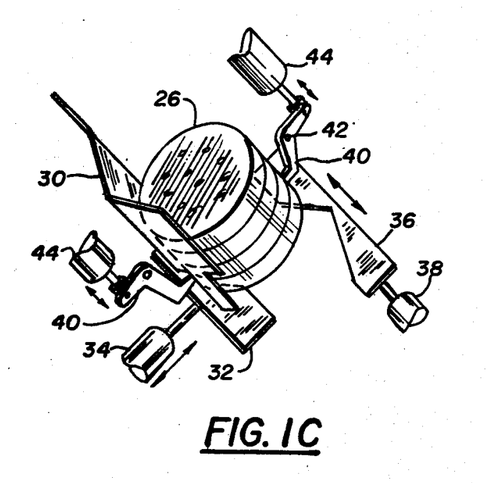
FIG. 1C represents a diagrammatic, isometric view showing a watermelon with ends removed arranged in a stacked array and ready for one at a time delivery of a slice of melon to a sectioning apparatus.

Fruit Slicing Apparatus of FIG. 1C

Referring next to the step of feeding sliced segments 26 one at a time to a sectioning apparatus, a preferred method is suggested in FIG. 1C. After slicing the whole fruit 16 into segments 26, the ends are removed for disposal means, not shown. The useful sliced segments 26 are arrayed on a slanted guide member 30 and by gravity move down this member to automatic feeding mechanism. Diagrammatically is shown a feeding apparatus wherein the bottommost slice 26 is supported by a slide plate 32 which is moved in and out, as indicated by the arrows, by a pneumatic or hydraulic cylinder 34. Also providing a support means on the opposite side of the slice 26 is a slide plate 36. This plate is moved along a longitudinal axis as indicated by the arrows. Back and forth movement in timed synchronism is provided by a pneumatic or hydraulic cylinder 38.

The side plate 32, like plate 36, is made with a shallow V-shape or contoured opening with the larger V-shaped opening adapted to come in way of the slice 26. To prevent the dropping of the stack of slices 26, a finger apparatus in combination with plates 32 and 36 is actuated by a timing apparatus. Like fingers 40 have sharpened ends or edges arranged at their lower portions. Hinge pins 42 are carried by a fixed frame, not shown. The upper outer end of these fingers 40 are each pivotally and operatively connected to a pneumatic or hydraulic cylinder 44. These cylinders 44 are also privotally connected to the fixed frame so that the fingers 40 are moved in a timed relationship to each other and to the plates 32 and 36.

The delivery of the bottommost slice 26 from the stack of slices occurs only after fingers 40 have been moved inwardly to enter the separation between the lowermost and the next above slice 26. These inwardly moved fingers support the above slices on the V-shaped guide member 30. After these fingers have been moved into supporting condition, the slide plate 32 and the slide plate 36 are moved by cylinders 34 and 38 respectively and more-or-less simultaneously to provide an opening to allow the lowermost slice 26 to drop or otherwise be delivered to a sectioning apparatus.

Figure 1D:
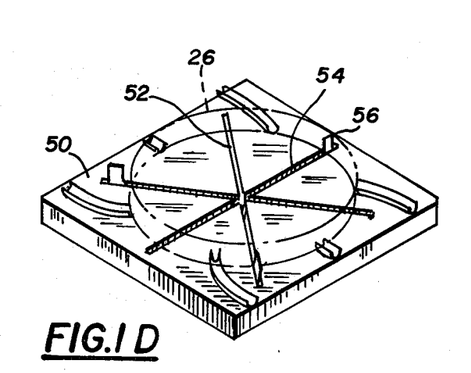
FIG. 1D represents the receiving plate and showing six sectioning blades in a recessed condition.

Slice Positioning as in FIG. 1D

Referring next to FIG. 1D, there is depicted a receiving plate 50 which has formed therein a plurality of slots 52 in which blades 54 are carried. Centering tabs 56 are formed on the ends of some of the blade portions. As shown, the slots 52 are six in number and are equally spaced but this number and spacing are merely a matter of choice. The centering tabs 56 are tapered to guide the slice into a more-or-less central position. They are shown as three equally spaced tabs, but again this only is a matter of selection.

Figure 1E:
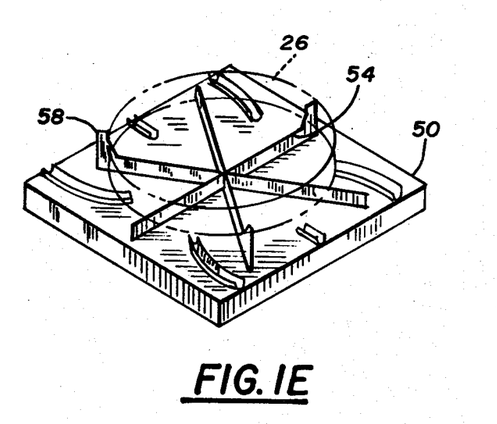
FIG. 1E represents a diagrammatic, isometric view of the receiving plate of FIG. 1D with the knives moved into a self-centering position for the slice before the pushing of that slice into the segmental cutters.

Slice Actuation as in FIG. 1E

Referring next to FIG. 1E, there is shown a slice 26 in phantom outline as lifted on blades 54 and centered by tabs 56. The blades 54 and tabs 58 which are an integral end portion of certain blades are lifted a defined or determined distance above the plate 50 by mechanism to be hereinafter more fully described.

Figure 1F:
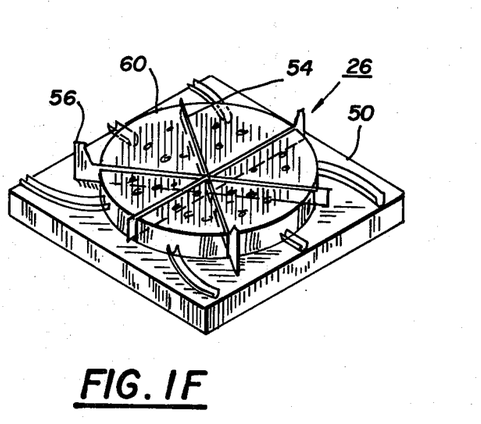
FIG. 1F represents the slice as cut into equal sections by the sectioning blades.

Slice Segmenting as in FIG. 1F

Referring next to FIG. 1F there is shown a slice 26 cut into equally shaped segments 60 by the knife blades 54 and also by a pusher plate or member, to be hereinafter more fully described. Preferably these shaped segments are held by the knife blades 54 until the blades are brought to and below the top surface of plate 50 at a discharge station, to be hereinafter more fully identified.

Figure 2:
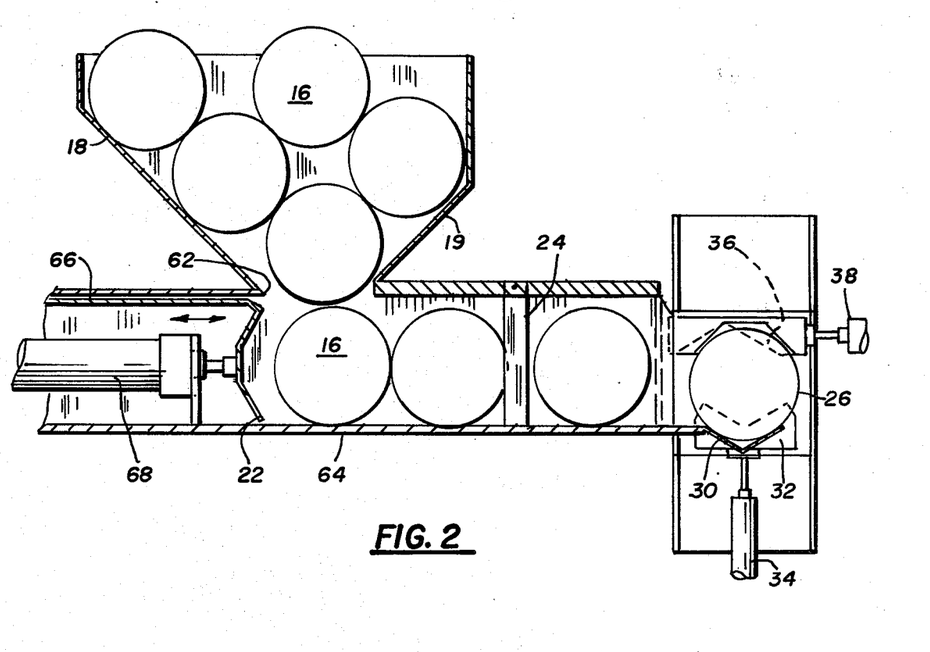
FIG. 2 represents a partly plan and side view and a diagrammatic showing as taken on the line 2—2 of FIG. 3 and showing a typical gating device whereby fruit is fed one at a time to a slicing station and then to subsequent sectioning apparatus.

Delivery of Fruit and Slicing as in FIG. 2

Referring next and now to FIG. 2, there is shown in greater detail the delivery and slicing apparatus as suggested in FIG. 1A and FIG. 1B. Fruit 16 is placed in the hopper and as guided by sides 18 and 19 flows downwardly by gravity to pass through an opening 62 so sized that only one fruit is able to drop to a floor member 64. Pusher member 22 has slots therein to accommodate the slicing grid 24. The top of pusher member 22 includes a top plate 66 which, as the pusher member is cycled to the right in way of the opening 62, provides a support surface which prevents the unwanted downward movement of fruit 16 until the pusher 22 is moved to the left as seen in the drawing.

The reciprocating movement of pusher member 22 is by a pneumatic or hydraulic cylinder 68 which moves this pusher in a timed relationship to other operations subsequent to slicing of the melon. This movement is generated on demand upon a signal from a slice counter or an electric eye, not shown. The pusher 22 is contoured to provide a cup-like pushing surface for engaging the side of the fruit 16. After being advanced to and through the slicing grid 24 the now sliced melon is brought in way of the slice feeding mechanism of FIG. 1C as diagrammatically seen in FIG. 2. The slide plate 32 is moved downwardly, as viewed in FIG. 2, by the cylinder 34 and slide plate 36 rightwardly by cylinder 38. When the plate 32 is drawn downwardly and slide plate 36 rightwardly to provide the maximum shown opening, the slice 26 drops through to the sectioning operation as in FIGS. 1C, 1D, 1E and FIG. 3 as described below.

Figure 3:
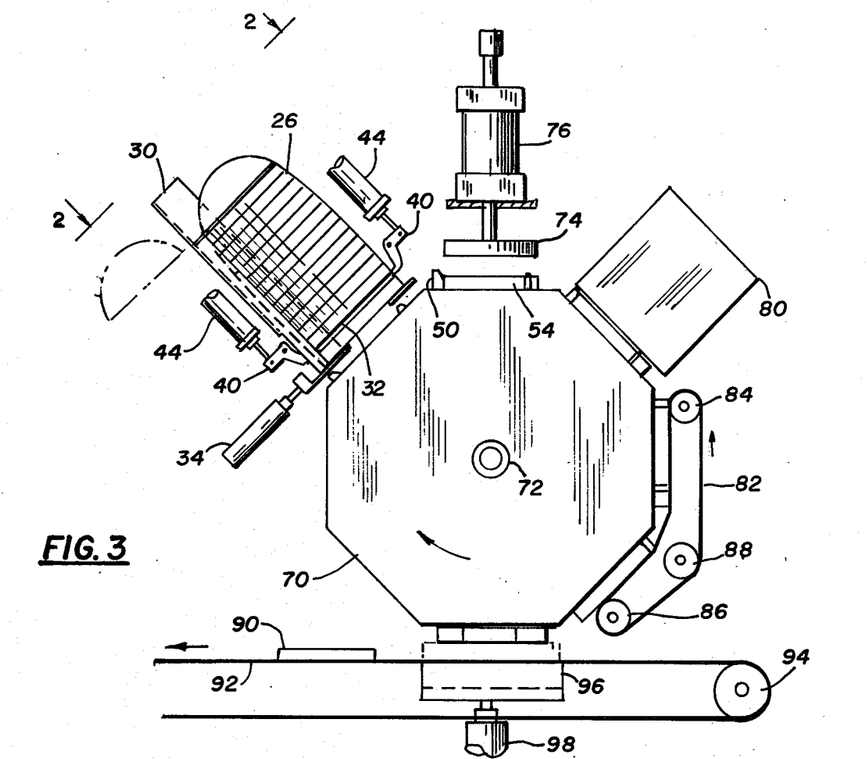
FIG. 3 represents a partly diagrammatic side view of the apparatus and showing a slice feeding station, a segmental cutting station and at a later position a stick inserting station as provided by a turret wheel after which the segmented slice sections are deposited on a delivery belt.

Turret Mechanism as Seen in FIG. 3

Referring next to FIG. 3 of the drawings, there is shown a more-or-less diagrammatic representation of the sectioning of the slice of melon. Above and to the left of an indexing turret 70 or wheel is the slice feeding mechanism of FIG. 1C. As above noted, the fingers 40 are actuated by cylinders 44 to hold the above slices 26 of the melon while the lowermost slice is released by the moving of plates 32 and 36 in synchronism with the sectioning apparatus.

In way of the delivery chute of the released slice are the tapered guide ends 56 of the sectioning grid by which the released slice is substantially centered as in FIGS. 1D and 1E. Shaft 72 which carries the turret 70 is now rotated to bring the turret and the slice of melon carried thereby to an indicated vertical condition. The knife blades 54 are raised from the plate or base 50 an amount sufficient for the fruit or melon slice to be fully sectioned through by the blades 54 and with the slice centered and supported by the blades 54, a pusher plate 74 is moved by a pneumatic or hydraulic cylinder 76 with and in a timed reciprocating motion and path. The pusher plate 74, as moved by the cylinder 76, engages the upper face or surface of the slice and pushes it downwardly on the knife grid 54 until the slice is sectioned. The pusher plate 74 may have grooves to coincide with the knife grid or have a resilient face to enable the slice to be cut through.

At the next station to which the now sectioned fruit is carried by the turret 70 sticks may be inserted. This station is identified as 80 and insertion, when desired, may be achieved by apparatus to be later described.

The sectioned fruit is advanced for two or more stations of the turret 70. A belt 82 carried by pulleys 84 and 86 is maintained at and in a desired tensioned condition by an idler pulley 88. Belt 82 may be powered, if desired.

After the sectioned fruit is moved from in way of belt 82 it is moved to the down position of the turret 70. The knife grid 54 is now moved to the condition of FIG. 1D whereat the sections of fruit 90 are released from this grid and fall onto a conveyor belt 92 as carried by a pulley 94. This belt may be moved close to the release of the sectioned fruit by a plate 96 as moved by a pneumatic or hydraulic cylinder 98.

The turret, as shown, is eight-sided and is intermittently advanced one-eighth revolution at prescribed time intervals. The turret may have more or less sides as desired by the designer of the mechanism.

Figure 4:
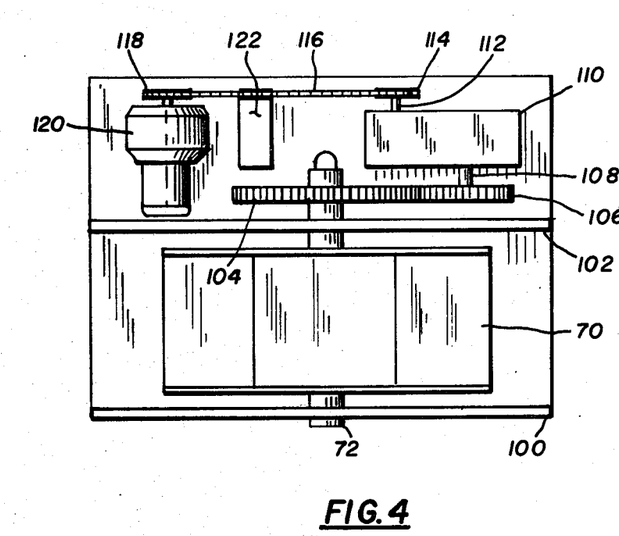
FIG. 4 represents a partly diagrammatic view looking downwardly on the apparatus of FIG. 3 and showing the turret or wheel transport and a proposed drive means.

Turret Advancing Mechanism of FIG. 4

In FIG. 4 there is depicted many of the elements contemplated to be used for the timed intermittently advanced turret 70. Shaft 72 is carried at its outboard end by a bearing, not shown, and member 100. Its inboard end is also supported by a bearing, not shown, in plate 102. A spur gear 104 is carried by and is secured to this shaft 72. A drive gear 106 is carried by and is secured to an output shaft 108 of an indexing drive unit 110. The indexing drive unit 110 is conventional and has an input shaft 112 which carries and is driven by sprocket or pulley 114. A roller chain or belt 116 is driven by a sprocket or pulley 118 carried by and driven by a gear motor 120. A function control device 122 by which it is contemplated that a programming of this apparatus is achieved and controlled may also be driven by the chain or belt 116. This function control may also be driven by gear motor 120.

Figure 5:
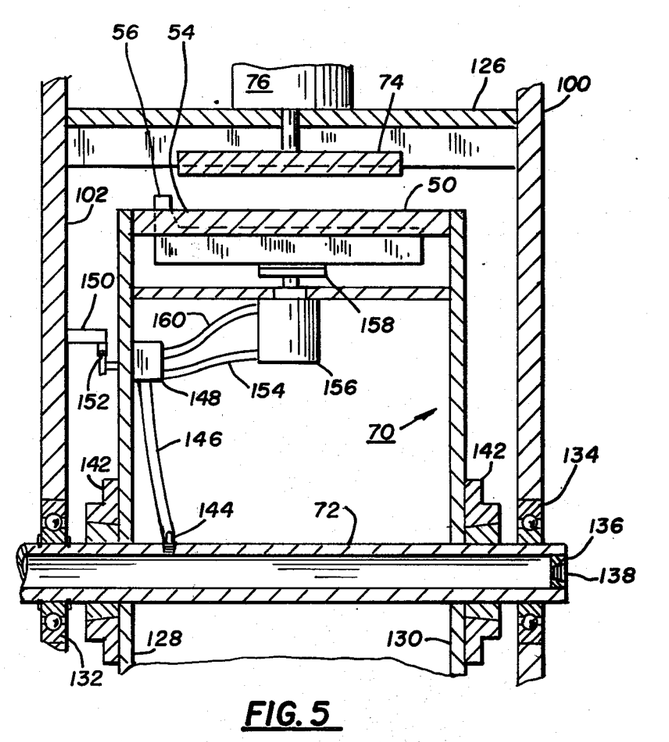
FIG. 5 represents a side view partially diagrammatic and showing apparatus for raising the segment cutting apparatus.

Sectioning Actuation as in FIG. 5

In FIG. 5 there is a diagrammatic side view, partly in section, of an apparatus whereby the knife grid is moved above the plate 50 and after sectioning and transport the knife grid 54 is moved to strip the sectioned fruit from the grid as in FIG. 3 above. In this view the front and rear plates 100 and 102 are shown as carrying shaft 72. An upper support plate 126 carries the cylinder 76 which has mounted on its rod end the pressure plate 74, above-noted. Plates 50 which as shown are eight in number are seen in FIG. 1D and are carried by end turret members 128 and 130 to form the turret 70, as seen in FIG. 3.

In the machine frame the shaft 72 is shown as a tube rotatable in bearings 132 and 134 mounted in plates 100 and 102. An end plug 136 has a pipe tap 138 and a pipe plug 140 and closes this end of the pipe shaft 72. The distal end of pipe 72 is not shown in this view but has a pipe plug and tap adapted to accept a swivel air fitting which is connected to a regulated air supply also conventional and not shown. Hubs 142 are of like construction and configuration and serve to position and hold end plates 128 and 130 to the pipe shaft 72. A pipe fitting 144 is shown in tube shaft 72 but in fact there may be as many fittings as turret stations. A pipe 146 leads from and is connected at one end to fitting 144 and at its other end to a valve 148. This valve comes in way of a trigger cam plate 150 wherein a finger 152 carried by said valve is actuated during a portion of the cycle. When this finger is actuated by the cam plate 150, air is caused to flow through conductor 154 to cylinder 156 which moves pusher plate 158 to raise the cutter grid upward to section the fruit slice carried thereon. After a determined degree or amount of rotation, the cam plate 150 is terminated and the valve 148 is cycled to the other extreme whereby pressurized air flows through conductor 160 to the other side of cyliner 156 to cause the cylinder 156, pusher plate 158 and the attached cutter grid to move toward the tube shaft 72 and to its retracted limit which corresponds to the lower extent or cycle of the turret 70.

It is to be noted that only one conduit 146 is required if and when this air is series connected to the several valves 148 to supply pressurized air to the valves and the several cylinders 156. There is one valve 148 and one cylinder 156 with each segment cutting grid 54 and plate 50. Although a cam 150 is illustrated to actuate the switch 152 for a portion of a cycle, other switch actuating means including a proximity signal can be used.

Figure 6:
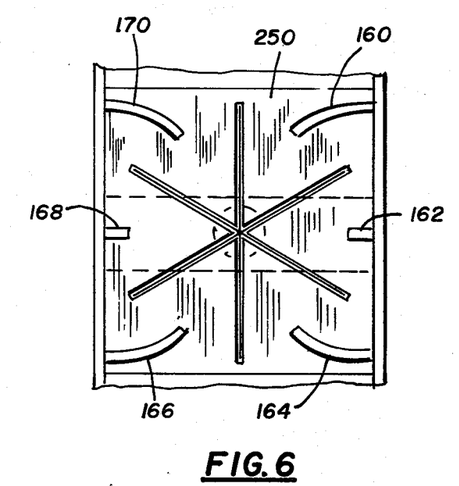
FIG. 6 represents a plan view of a segment producing apparatus and showing in particular means for inserting sticks into the midportion of each segment.

Stick Insertion Station of FIG. 6

When it is desired to equip or provide a handle means with each or some of the sections of fruit, station 80 may be utilized. In FIG. 6 it is anticipated that the sectioning grid 54 divides the slice 26 into more-or-less six equally pie-shaped portions 60. It is anticipated that the rind or skin of the fruit is left with and on the portion 60. The plate 50 is altered to plate 250 and is provided with guide slots 160, 162, 164, 166, 168 and 170. Each slot at its inner end is open to and is next to the outer surface of portion 60. Inexpensive sticks 192 which may be of plastic are fed to and into each slot and by either rods or gripping finger means are driven into the segmented fruit a determined distance. Tubes which are disposed above the surface of plate 50 may also be employed. These tubes are reciprocably operated by mechanism, not shown. The particular mechanism and arrangement depends on the particular stick and its composition. For example, if the stick is of plastic and is partially flexible the feeding apparatus will be different than if the stick is rigid such as occurs with wood. The number of sticks, the penetration of each into a sectioned portion and the like matters are merely a matter of selection to accommodate specific desires of the producer of the product.

Figure 7:
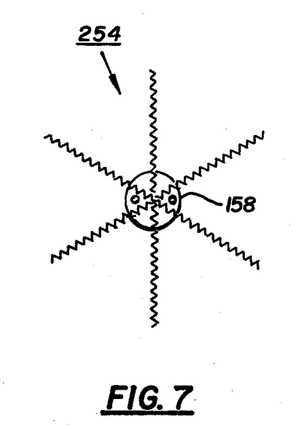
FIG. 7 shows an alternate cutting blade wherein a wavy rather than a straight line cut is produced between segment sections.

Alternate Sectioning Grid of FIG. 7

Depicted in FIG. 7 is an alternate sectioning grid 254. Rather than straight blades, as shown in FIGS. 1D, 1E, and 1F, the blades are made with a wavy pattern although arranged in a generally pie-shaped array. Whether a wavy, saw-tooth pattern as depicted in FIG. 7 or other pattern such as a Christmas tree, the segmenting grid is likely made as a steel rule knife joined at its center and secured to a pusher plate 158 for movement toward and away from the shaft pipe 72 by cylinder 156.

Figure 8:
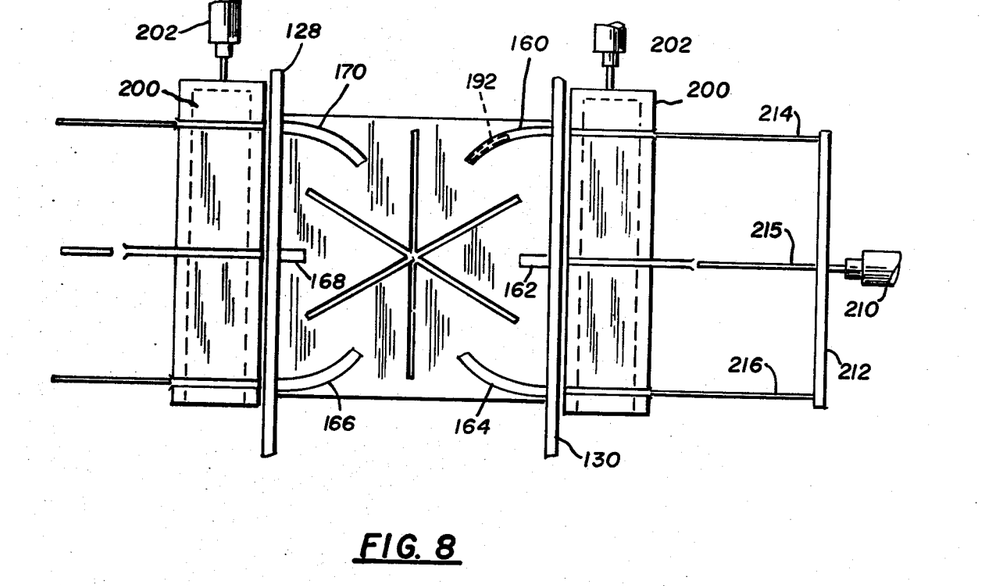
FIG. 8 represents a partly diagrammatic view of a stick inserting station wherein inexpensive sticks are fed to a midportion of each exterior rim of the sectioned fruit and are then inserted.
Figure 9:
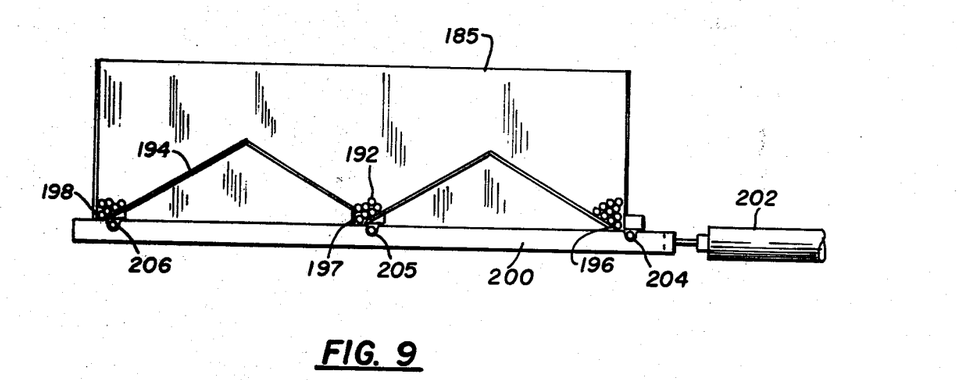
FIG. 9 represents a side view, partly diagrammatic, of a stick gating and feeding mechanism.

Stick Feeding and Inserting as in FIGS. 8 and 9

In FIGS. 8 and 9 there is depicted a stick inserting mechanism which is partly diagrammatic. As shown, plate 50 has openings for the knife grid 54 by which the slice 26 is cut into substantially equally shaped and sized segments 60. Curved tubes 160, 164, 166 and 170 are shown in right and left attitudes and arranged in mirror image relationship as pairs. Open-sided tubes 160 and 164 are secured to one side of plate 250 while tubes 166 and 170 are secured in the distal side of plate 250. Short straight open-sided tubes 162 and 168 are also employed. These tubes are mounted in and are secured to plate 250.

Sticks 192, as shown for use in this apparatus, are contemplated to be of plastic and to a determined extent are bendable. Like troughs 194 have their bottoms formed to provide three valleys to receive and retain the sticks which are piled in the troughs and by the sloped portions of the bottoms are aligned in a desired attitude. At the bottommost portion of each valley is provided a slot respectively identified as 196, 197 and 198. A slide member 200 moved to and fro by a cylinder 202 has grooves 204, 205 and 206 which at one limit of movement of the cylinder 202 brings the respective grooves in way of the slots so that one stick 192 is deposited in each groove. The cylinder is then cycled to its other extreme of movement whereby the groove and the sticks are brought into alignment with the tubes leading to the fruit sections.

A pneumatic or hydraulic cylinder 210 has its piston rod connected to a header member 212. This header, as shown, carries three pusher rods identified as 214, 215 and 216. Rods 214 and 216 are of like length and are longer than the middle rod 215. The extra length provided on rods 214 and 216 is so that stick 192 in grooves 204 and 206 may be engaged for the longer travel through tubes 160 and 164 prior to rod 215 engaging a stick and pushing the stick through tube 162. A like arrangement is provided at the left side for rods to push sticks 192 through open-sided tubes 170 and 166 and 168.

Although curved and straight open-sided tubular members are mentioned above, these may be grooves formed in the base member. The grooves or tubular members may be carried with the plate member 250 or, if desired, the stick inserting mechanism can be raised and lowered when the sectioned slice is advanced by the turret 70 as in FIG. 3.

The stick insertion apparatus is made to suit the section produced. Many times the stick is inserted through the skin or rind which additionally supports the section 60 which is later sold to customers.

Figure 10:
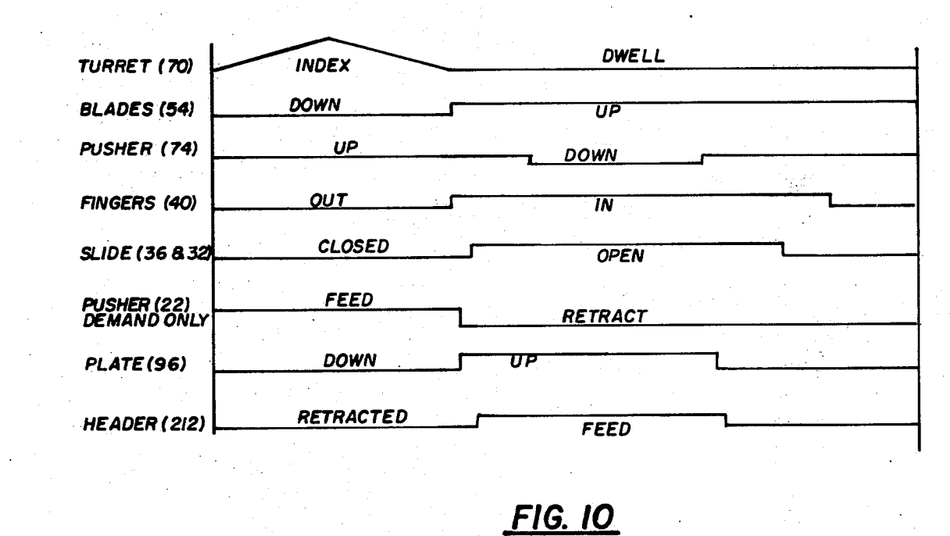
FIG. 10 represents a circuit diagram showing the automatic operation and sensing of the various operations of the machine apparatus and the method developed therewith.

Timing Diagram of FIG. 10

In FIG. 10 is represented a timing diagram for the operation of the apparatus, above described. This diagram shows the intermittent movement of the turret and during its dwell time period the slice is sectioned and sticks where and when desired at another station are inserted into the melon sections. Release of a slice occurs also during the dwell time of the turret. Slicing of the melon is on demand and occurs only when the slice storage is depleted. Thus, the pusher sequence is shown as a demand only operation. The delivery of these slices to and onto the conveyor belt may also employ the lifting of the belt by cylinder 98 during the dwell period.

Figure 11:
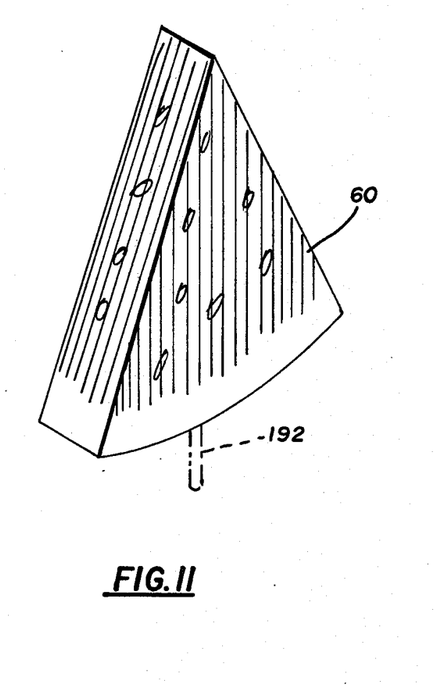
FIG. 11 represents an isometric view of a wedge-shaped watermelon section with an inserted stick shown in phantom outline.

Product as in FIG. 11

In FIG. 11 is shown the sectioned fruit 60 which is wedge-shaped and, as shown, may have a stick 192 inserted into the rind portion generally central of the section. This product is proposed to be automatically produced by the apparatus above described.

Figure 12A:
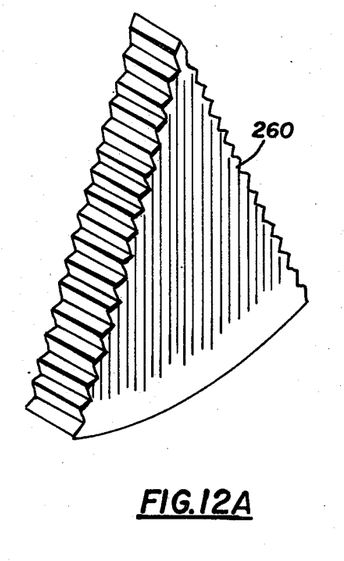
FIG. 12A represents an isometric view of a wedge-shaped watermelon section in which the wedge edges are formed with a wavy cut such as is produced with the knife assembly of FIG. 7.
Figure 12B:
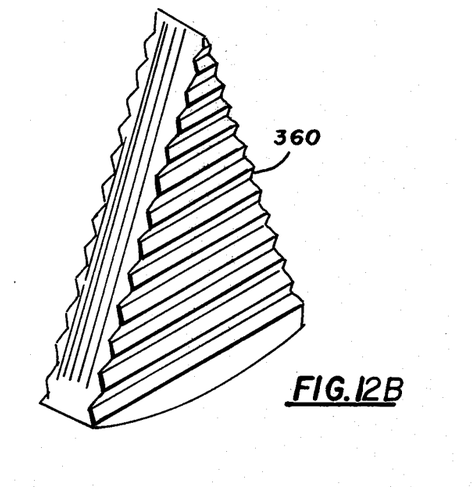
FIG. 12B represents an isometric view of a wedge-shaped watermelon section similar to that of FIG. 12A but with the faces having a wavy configuration produced with and by appropriately shaped knives in a grid such as is indicated in FIG. 1B.

Sections as in FIGS. 12A and 12B

Referring finally to FIGS. 12A and 12B there is shown alternate configurations of the slice sections. In FIG. 12A a section 260 has its edges formed in a wavy pattern such as is produced by the cutter 254 of FIG. 7.

In FIG. 12B a section 360 has its planar faces formed with a wavy pattern. This wavy cut is produced when the melon is pushed through the slicing grid 24. The knives for producing such a pattern must be formed with a wavy pattern and as that in the sectioning apparatus of FIG. 7.

It is to be noted that a section of melon, if desired, can be formed with a wavy pattern at both the tapering wedge edges as shown in FIG. 12A and with the planar faces formed with a wavy pattern such as is shown in FIG. 12B. This combined section is merely a matter of selection as the pattern formed in the knife portions are dependent upon the forming skill of those who shape the knife segments.

The above-described apparatus also provides means for practicing a method for automatically slicing and sectioning an edible such as fruit and delivering said sections to a given station for further processing, said method including the steps of receiving and placing a plurality of edibles such as fruit in a chute having a discharge sized to pass only one edible at a time to a delivery station; arranging a pusher at said delivery station and moving this pusher to two limits of movement and at a first limit of movement of the pusher allowing one edible to pass from the chute and in way of the pusher when the space below the chute and in front of the pusher is empty; reciprocably moving the pusher to the extremes of movement during which means carried by the pusher closes the chute discharge to downward flow of edibles; placing a slicing grid in the path of an edible as moved by the pusher, and slicing the edibles into slices of determined thickness when said edible is pushed to and through the grid by the advancing and advanced pusher; providing means on the pusher face to accommodate the grid while advancing the edible sufficiently through the grid for slicing of the edible, this means providing for a repeated advancing of the pusher to a second limit without damage to or disarrangement of the grid; delivering useful sliced segments of the edible product to a gravity fed slide member; transferring and delivering the lowermost slice to an indexing apparatus while retaining the above slices to prevent the unwanted dropping of the stack of slices to the transferring means; advancing the indexing apparatus and a single sliced segment to a sectioning station; substantially centering the slice and then advancing a sectioning cutter into and through the sliced segment while oppositely disposed means is provided for preventing the sliced product from moving away from the sectioning cutter; advancing the index mechanism and the sectioned product as well as the sectioning cutter to a discharge station; withdrawing the sectioning cutter from the sectioned slice at this discharge station and depositing the sectioned pieces into a receiving means, and transporting the sectioned segments to other operations which may include individual wrapping of the sections.

Terms such as "left," "right," "up," "down," "bottom," "top," "front," "back," "in," "out" and the like are applicable to the embodiment shown and described in conjunction with the drawings. These terms are merely for the purpose of description and do not necessarily apply to the position in which the apparatus and method of slicing and sectioning an edible may be constructed or used.

While a particular embodiment of this apparatus of the slicing and sectioning knives and alternate embodiments have been shown and described it is to be understood the invention is not limited thereto since modifications may be made within the scope of the accompanying claims and protection is sought to the broadest extent the prior art allows.

What is claimed is:

1. Apparatus for automatically slicing and sectioning an edible such as fruit and delivering said sections to a given station for further processing, said automatic apparatus including: (a) a chute for receiving a plurality of edibles such as fruit, said chute having a discharge sized to pass only one edible at a time to a delivery station; (b) a pusher at said delivery station and reciprocably movable to two limits of movement and at a first limit of movement the pusher allows one edible to pass from the chute and in way of the pusher when the space below the chute and in front of the pusher is empty; (c) means for reciprocably moving the pusher to two extremes of movement; (d) means carried by the pusher to close the chute discharge to a downward flow of edibles except when the pusher is at said first limit of movement; (e) a slicing grid in the path of an edible as moved by the pusher, the grid disposed to slice the edible into segments of determined thickness when pushed to and through the grid by the advancing and advanced pusher; (f) means on the pusher face to accommodate the grid while advancing the edible sufficiently through the grid for slicing of the edible, this means providing for repeated advancing of the pusher to a second limit of movement without damage to or disarrangement of the grid; (g) means for delivering useful sliced segments of the edible product to a gravity fed slide member; (h) means for transferring and delivering the lowermost slice to an indexing apparatus while means for retaining the above slices is actuated to prevent the unwanted dropping of the stack of slices to the transferring means; (i) means for advancing the indexing apparatus and a single sliced segment to a sectioning station; (j) means for substantially centering the slice and then advancing a sectioning cutter into and through the sliced segment while oppositely disposed means is provided for preventing the sliced product from moving away from the sectioning cutter; (k) means for advancing the index mechanism and the sectioned product as well as the sectioning cutter to a discharge station; (l) means for withdrawing the sectioning cutter from the sectioned slice at this discharge station and depositing the sectioned pieces onto a receiving means, and (m) means for transporting the sectioned segments to other operations which may include individual wrapping of the sections.

2. Apparatus for automatically slicing and sectioning an edible such as fruit as in claim 1 in which the chute for receiving the edibles is of a size to receive and retain simultaneously a plurality of edibles of elongated configuration and the discharge is at the small end of a tapered section of the chute.

3. Apparatus for automatically slicing and sectioning an edible such as fruit as in claim 2 in which the means for moving the pusher is a cylinder movable to two limits by a pressurized fluid.

4. Apparatus for automatically slicing and sectioning an edible such as fruit as in claim 2 in which the means carried by the pusher to close the discharge of the chute to unwanted flow is a slide attached to and movable with the pusher, the slide closing the discharge opening of the chute except when the pusher is at its rear limit of movement.

5. Apparatus for automatically slicing and sectioning an edible such as fruit as in claim 1 in which the slicing grid is a plurality of steel rule knives spaced a like distance apart and extending above and below the diameter of the edible to be carried by the pusher.

6. Apparatus for automatically slicing and sectioning an edible such as fruit as in claim 1 in which the means for transferring and delivering the lowermost slice includes a slide plate arranged on opposite sides of the stack, these slide plates adapted for synchronized movement to provide an opening at least slightly larger than the slice to permit the slice to pass through the opening.

7. Apparatus for automatically slicing and sectioning an edible such as fruit as in claim 6 in which the sliced edibles are arranged on a slanted guide member and by gravity move to and toward the slide plates and said slide plates are each moved by a cylinder actuated by pressurized fluid.

8. Apparatus for automatically slicing and sectioning an edible such as fruit as in claim 7 in which a first slide plate is moved toward and away from the axis of the sliced stack in and along a path which is coincident with a radius line and the second slide plate is moved in a path normal to the path of the first slide plate.

9. Apparatus for automatically slicing and sectioning an edible such as fruit as in claim 8 in which each of the slide plates is made with a shallow V-shaped opening which is disposed toward the other slide plate.

10. Apparatus for automatically slicing and sectioning an edible such as fruit as in claim 7 in which the means for retaining the above slices are opposed fingers which enter the slicing separation between the bottommost slice and the next above slice and timed actuating means is provided to be actuated to cause the fingers to enter and support the sliced stack during delivery of the lowermost slice.

11. Apparatus for automatically slicing and sectioning an edible such as fruit as in claim 10 in which each finger is pivotally supported by frame means and is actuated by a cylinder which is fed pressurized liquid in a timed relationship to the discharge of the slice.

12. Apparatus for automatically slicing and sectioning an edible such as fruit as in claim 1 in which the sectioning apparatus is carried by an indexing apparatus and the centering means are tapered tabs which extend above a receiving plate upon which the sliced segment is carried by the indexing mechanism as it is moved through sectioning and delivery.

13. Apparatus for automatically slicing and sectioning an edible such as fruit as in claim 11 in which the tapered tabs are made as end portions of reciprocating blades carried in slots formed in the receiving plate forming a part of the indexing mechanism.

14. Apparatus for automatically slicing and sectioning an edible such as fruit as in claim 12 in which the knife blades for sectioning the slice are attached to and moved in a reciprocating manner by a cylinder carried by the indexing apparatus, the moved knife blades sectioning the slice at a desired position.

15. Apparatus for automatically slicing and sectioning an edible such as fruit as in claim 13 and in which there is a support plate which is moved in synchronism with the movement of the knife blades to support the slice against unwanted movement during sectioning thereof.

16. Apparatus for automatically slicing and sectioning an edible such as fruit as in claim 14 in which the knife blades are moved to a retracted condition at the bottom of the index rotation to strip and dislodge the sections from the knife sectioning apparatus.

17. Apparatus for automatically slicing and sectioning an edible such as fruit as in claim 15 in which there is provided a cam actuator adapted to engage a valve actuator during that period of movement of the indexing mechanism whereat the sectioning knives are to be maintained at an elevated sectioning position above the support plate.

18. Apparatus for automatically slicing and sectioning an edible such as fruit as in claim 16 in which there is provided a belt retainer movable with the indexing mechanism to keep the sectioned product in place on the elevated knife blades until the sectioned product reaches the bottom index position.

19. Apparatus for automatically slicing and sectioning an edible such as fruit as in claim 1 in which the index mechanism has a station at which a stick means is inserted into each and every section for ease in grasping the section for eating the edible portion.

20. Apparatus for automatically slicing and sectioning an edible such as fruit as in claim 1 in which the wedge-shaped edge of the sections are made as a wavy line.

21. Apparatus for automatically slicing and sectioning an edible such as fruit as in claim 1 in which at least one of the planar faces of the section is made as a wavy line.

22. Apparatus for automatically slicing and sectioning an edible such as fruit as in claim 1 in which the means for transporting the sectioned segments to other operations is a belt conveyor and there is a timed lifting apparatus which lifts a portion of the belt conveyor toward the discharge station of the turret as the sectioned fruit is discharged.

23. A method for automatically slicing and sectioning an edible such as fruit and delivering said sections to a given station for further processing, said method including the steps: (a) receiving and placing a plurality of edibles such as fruit in a chute having a discharge sized to pass only one edible at a time to a delivery station; (b) arranging a pusher at said delivery station and moving this pusher to two limits of movement and at a first limit of movement of the pusher allowing one edible to pass from the chute and in way of the pusher when the space below the chute and in front of the pusher is empty; (c) reciprocably moving the pusher to the extremes of movement during which means carried by the pusher closes the chute discharge to downward flow of edibles; (d) placing a slicing grid in the path of an edible as moved by the pusher, and slicing the edibles into slices of determined thickness when said edible is pushed to and through the grid by the advancing and advanced pusher; (e) providing means on the pusher face to accommodate the grid while advancing the edible sufficiently through the grid for slicing of the edible, this means providing for a repeated advancing of the pusher to a second limit without damage to or disarrangement of the grid; (f) delivering useful sliced segments of the edible product to a gravity fed slide member; (g) transferring and delivering the lowermost slice to an indexing apparatus while retaining the above slices to prevent the unwanted dropping of the stack of slices to the transferring means; (h) advancing the indexing apparatus and a single sliced segment to a sectioning station; (i) substantially centering the slice and then advancing a sectioning cutter into and through the sliced segment while oppositely disposed means is provided for preventing the sliced product from moving away from the sectioning cutter; (j) advancing the index mechanism and the sectioned product as well as the sectioning cutter to a discharge station; (k) withdrawing the sectioning cutter from the sectioned slice at this discharge station and depositing the sectioned pieces into a receiving means, and (l) transporting the sectioned segments to other operations which may include individual wrapping of the sections.

* * * * *